United States Patent
McManaman et al.

(10) Patent No.: US 11,843,124 B2
(45) Date of Patent: Dec. 12, 2023

(54) URETHANE BASED ADHESIVES FOR SECURING AND SEALING BATTERY PACK ENCLOSURE ASSEMBLIES

(71) Applicant: FORD GLOBAL TECHNOLOGIES, LLC, Dearborn, MI (US)

(72) Inventors: James M. McManaman, West Bloomfield, MI (US); Louis Paspal, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/729,092

(22) Filed: Apr. 26, 2022

(65) Prior Publication Data

US 2022/0255168 A1    Aug. 11, 2022

Related U.S. Application Data

(62) Division of application No. 16/739,463, filed on Jan. 10, 2020, now Pat. No. 11,342,617.

(51) Int. Cl.
*H01M 50/183* (2021.01)
*H01M 50/166* (2021.01)

(52) U.S. Cl.
CPC ....... *H01M 50/183* (2021.01); *H01M 50/166* (2021.01)

(58) Field of Classification Search
CPC .......................... H01M 50/166; H01M 50/183
See application file for complete search history.

(56) References Cited

U.S. PATENT DOCUMENTS

| | | | |
|---|---|---|---|
| 5,386,084 | A | 1/1995 | Risko |
| 6,410,185 | B1 | 6/2002 | Takahashi et al. |
| 7,766,544 | B2 | 8/2010 | Shibuya et al. |
| 8,389,142 | B2 | 3/2013 | Kreiner et al. |
| 9,761,851 | B2 | 9/2017 | Onodera et al. |
| 2010/0059208 | A1 | 3/2010 | Nakamura |
| 2012/0141855 | A1 | 6/2012 | Okada et al. |
| 2015/0380695 | A1 | 12/2015 | Hanaki et al. |
| 2016/0293914 | A1 | 10/2016 | Miller et al. |
| 2019/0140221 | A1 | 5/2019 | Tan et al. |

*Primary Examiner* — Cynthia H Kelly
*Assistant Examiner* — Niara Trant
(74) *Attorney, Agent, or Firm* — David B. Kelley; Carlson, Gaskey & Olds, P.C.

(57) ABSTRACT

This disclosure details exemplary battery pack designs for use in electrified vehicles. An exemplary battery pack may include a multi-piece enclosure assembly and an urethane based adhesive. The urethane based adhesive may function as both a fastener for securing the enclosure assembly components together and as a seal for blocking the ingress of moisture into the interior of the battery pack. Associated battery pack assembly methods are also disclosed.

19 Claims, 7 Drawing Sheets

URETHANE BASED ADHESIVES FOR SECURING AND SEALING BATTERY PACK ENCLOSURE ASSEMBLIES

CROSS-REFERENCE TO RELATED APPLICATION

This is a divisional of U.S. patent application Ser. No. 16/739,463, which was filed on Jan. 10, 2020.

TECHNICAL FIELD

This disclosure relates generally to electrified vehicle battery packs, and more particularly to urethane based adhesives for securing and sealing battery pack enclosure assemblies.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery arrays that each include groupings of battery cells for powering the electric propulsion of electrified vehicles. The battery arrays are typically housed within an enclosure assembly, and the enclosure assembly is typically sealed using gasket-type seals to prevent moisture from leaking into the interior of the enclosure assembly.

SUMMARY

A battery pack according to an exemplary aspect of the present disclosure includes, among other things, a tray, a cover, and a urethane based adhesive disposed between the tray and the cover. A first end portion of the urethane based adhesive overlaps a second end portion of the urethane based adhesive at a crossover location on either the tray or the cover.

In a further non-limiting embodiment of the foregoing battery pack, the urethane based adhesive is disposed between a first peripheral flange of the tray and a second peripheral flange of the cover.

In a further non-limiting embodiment of either of the foregoing battery packs, a fastener is received through the second peripheral flange and into the first peripheral flange.

In a further non-limiting embodiment of any of the foregoing battery packs, the fastener is located outboard of the urethane based adhesive.

In a further non-limiting embodiment of any of the foregoing battery packs, the first end portion of the urethane based adhesive overlaps the second end portion by an overlap distance of at least 80 mm.

In a further non-limiting embodiment of any of the foregoing battery packs, the crossover location is displaced from any corner of either the tray or the cover.

In a further non-limiting embodiment of any of the foregoing battery packs, a fastener is inserted through the cover and into the tray.

In a further non-limiting embodiment of any of the foregoing battery packs, the fastener is positioned outboard of the urethane based adhesive.

In a further non-limiting embodiment of any of the foregoing battery packs, the tray and the cover establish an enclosure assembly, and a battery array is housed inside the enclosure assembly.

In a further non-limiting embodiment of any of the foregoing battery packs, the urethane based adhesive is configured as both a fastener and a seal of the battery pack.

A method of assembling a battery pack according to another exemplary aspect of the present disclosure includes, among other things, applying a bead of a urethane based adhesive in a first configuration to a first component of an enclosure assembly of the battery pack, and moving a second component of the enclosure assembly into the bead, thereby compressing the bead into a second configuration.

In a further non-limiting embodiment of the foregoing method, the first configuration is a non-compressed configuration and the second configuration is a compressed configuration.

In a further non-limiting embodiment of either of the foregoing methods, the bead includes a triangular shape in the first configuration and a rectangular shape in the second configuration.

In a further non-limiting embodiment of any of the foregoing methods, applying the bead includes overlapping a second end portion of the bead with a first end portion of the bead by an overlap distance.

In a further non-limiting embodiment of any of the foregoing methods, the overlap distance is at least 80 mm.

In a further non-limiting embodiment of any of the foregoing methods, the method includes, prior to applying the bead, cleaning a sealing surface of the first component.

In a further non-limiting embodiment of any of the foregoing methods, the sealing surface is established by a peripheral flange of the first component.

In a further non-limiting embodiment of any of the foregoing methods, the first component is a tray and the second component is a cover.

In a further non-limiting embodiment of any of the foregoing methods, the first component is a cover and the second component is a tray.

In a further non-limiting embodiment of any of the foregoing methods, the method includes holding the first and second components together with a fastener.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack may include a multi-piece enclosure assembly and an urethane based adhesive. The urethane based adhesive may function as both a fastener for securing the enclosure assembly components together and as a seal for blocking the ingress of moisture into the interior of the battery pack. Associated battery pack assembly methods are also disclosed. These and other features are discussed in greater detail in the following paragraphs of this detailed description.

Figure 1:
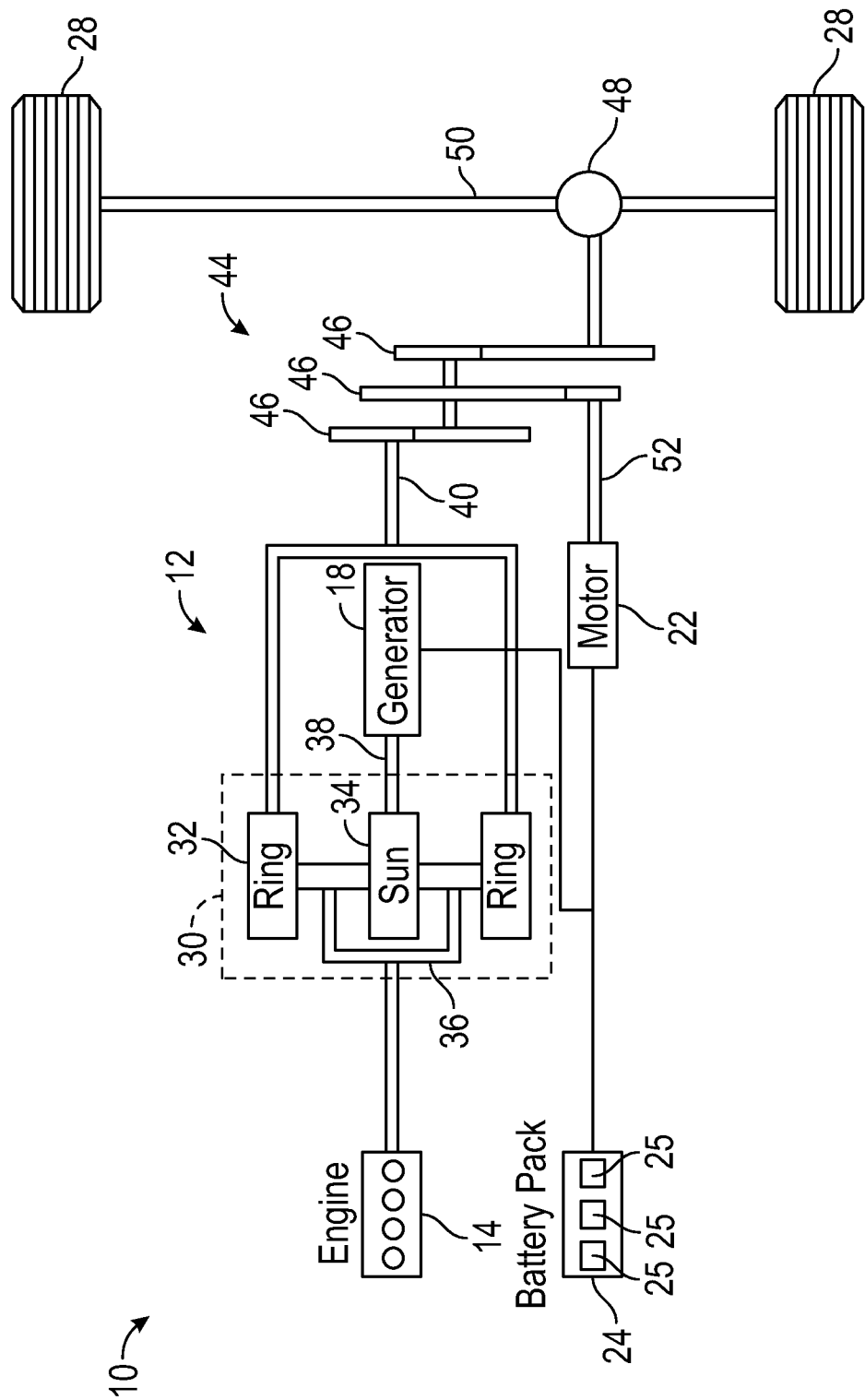
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
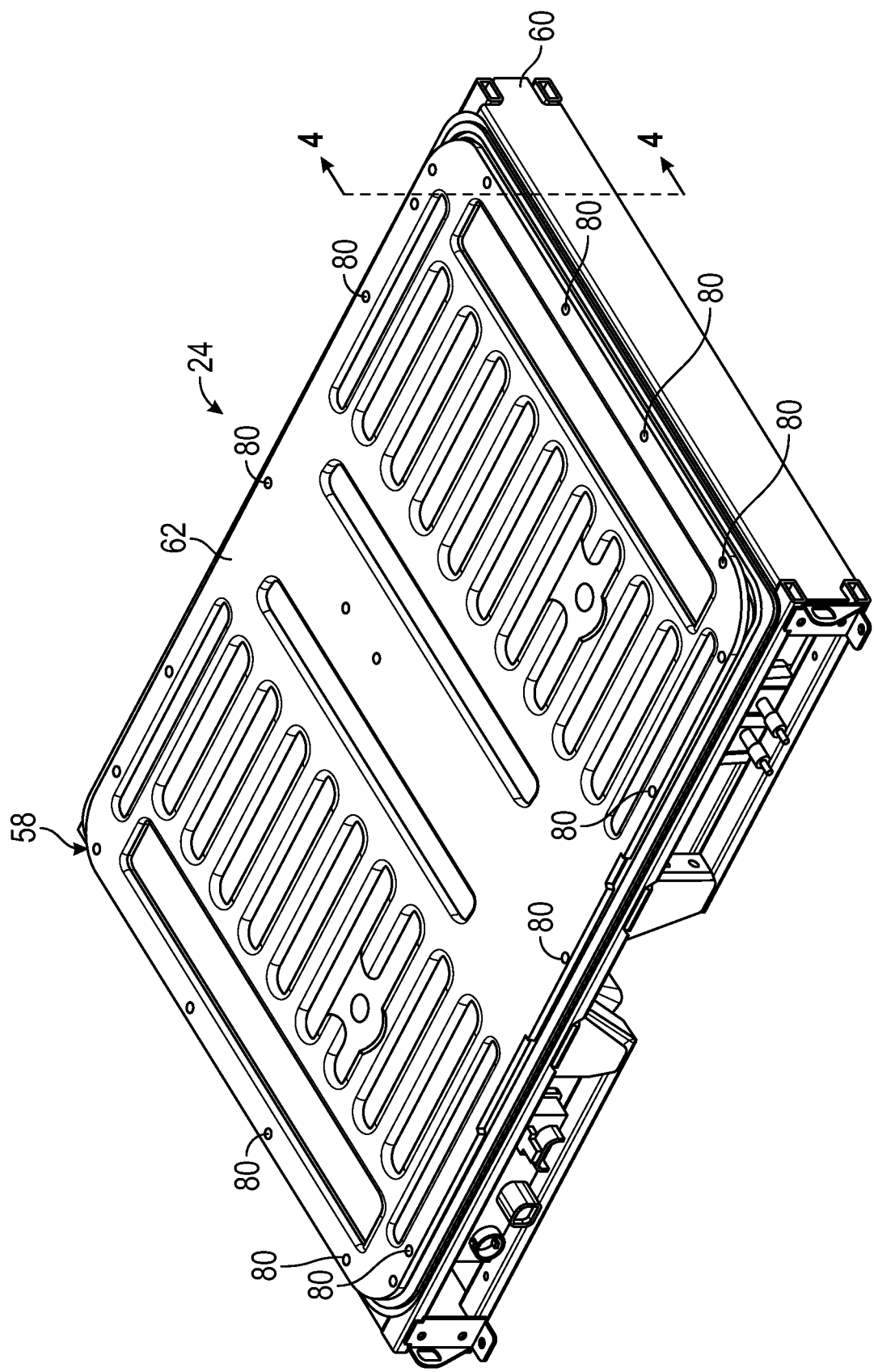
FIG. 2 illustrates a battery pack of an electrified vehicle.
Figure 3:
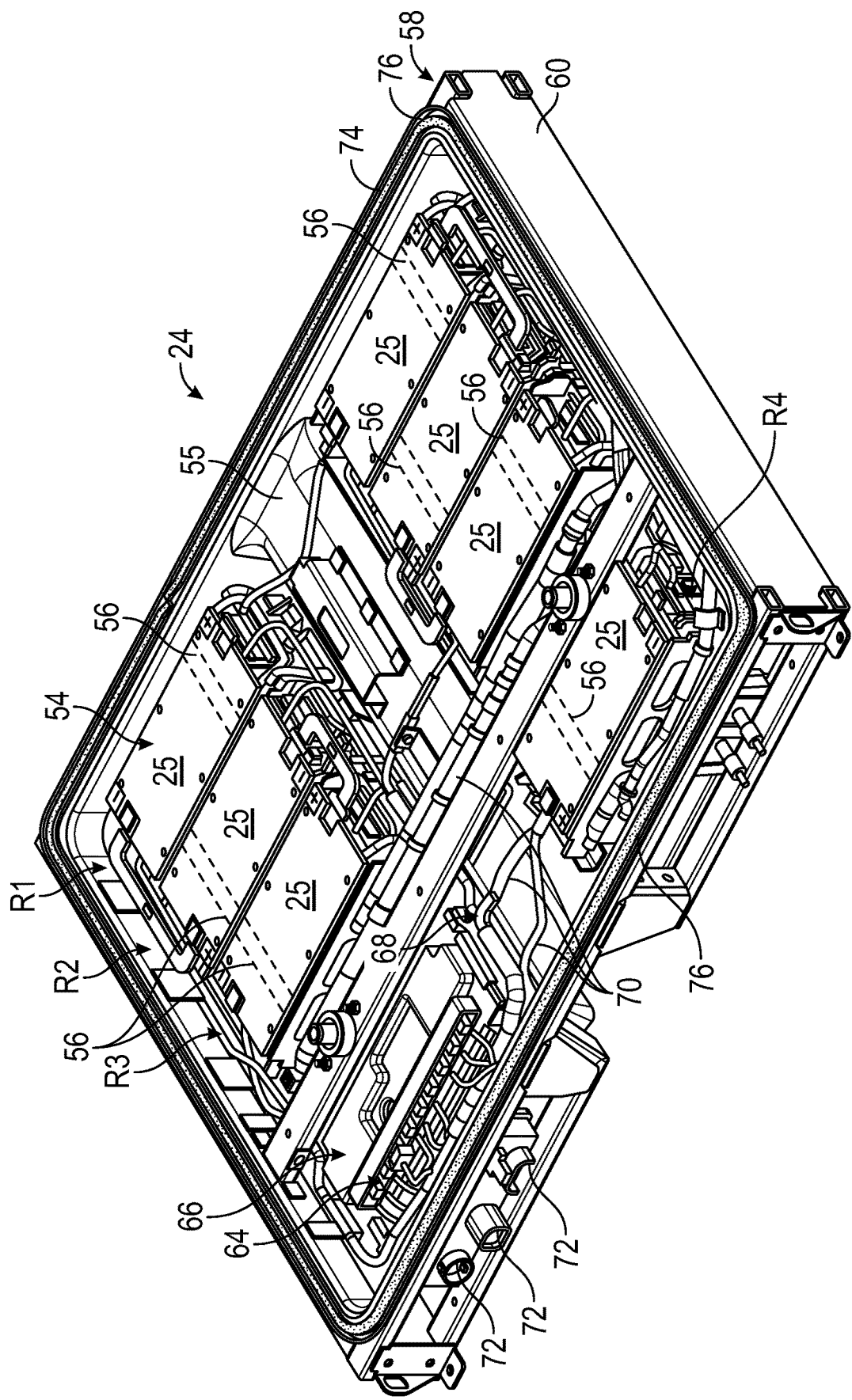
FIG. 3 illustrates a battery system of the battery pack of FIG. 2. A cover of an enclosure assembly of the battery pack is removed in FIG. 3 to better illustrate certain components of the battery system.
Figure 4:
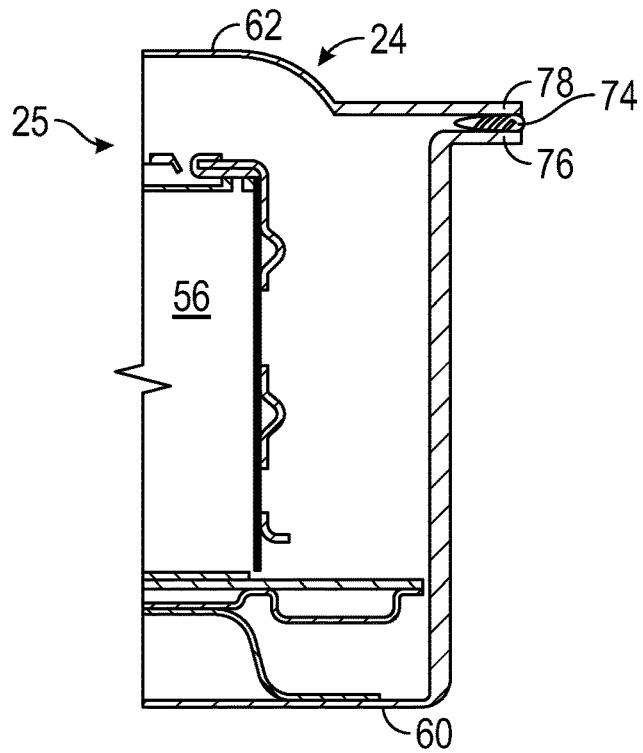
FIG. 4 is a cross-sectional view through section 4-4 of FIG. 2.

FIGS. 2-4 schematically illustrate a battery pack 24 that can be employed within an electrified vehicle. For example, the battery pack 24 could be incorporated as part of the powertrain 10 of the electrified vehicle 12 of FIG. 1. FIG. 2 is an assembled, perspective view of the battery pack 24, portions (e.g., a cover 62) of the battery pack 24 are removed in FIG. 3 in order to better visualize its internal contents, and FIG. 4 is a cross-sectional view of the battery pack 24.

The battery pack 24 may include a battery system 54 (best shown in FIG. 3) housed within an enclosure assembly 58. The enclosure assembly 58 may be a sealed enclosure and may embody any size, shape, and configuration within the scope of this disclosure. In an embodiment, the enclosure assembly 58 includes a tray 60 and a cover 62. During assembly, the battery system 54 may be positioned within the tray 60, and the cover 62 may then be fixedly secured to the tray 60 to seal the battery system 54 therein (discussed further below). The tray 60 and the cover 62 may be made of any material or combination of materials, including metallic and/or polymeric materials.

The battery system 54 includes a plurality of battery cells 56 that store energy for powering various electrical loads of the electrified vehicle 12. The battery system 54 could include any number of battery cells 56 within the scope of this disclosure. Therefore, this disclosure is not limited to the exact configuration of the battery system 54 shown in FIG. 3.

The battery cells 56 of the battery system 54 may be stacked side-by-side to construct a grouping of battery cells 56, sometimes referred to as a battery array. In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery system 54 depicted in FIG. 3 includes a plurality of adjacent rows R1-R4 of battery arrays 25. In an embodiment, Rows R1 to R3 of the battery system 54 each include two battery arrays and Row R4 includes one battery array for a total of seven battery arrays. However, the battery pack 24 could include a greater or fewer number of battery arrays and still fall within the scope of this disclosure. Unless stated otherwise herein, reference numeral "25" may refer to any of the battery arrays 25 of the rows R1 to R4.

The battery arrays 25 may be arranged in any configuration within the enclosure assembly 58. In an embodiment, the adjacent battery arrays 25 of rows R1 to R3 are separated by a structural cross-member 55 extending between opposing side walls of the tray 60.

The battery system 54 may include a plurality of electrical components (see features 64-72) that establish an electrical assembly of the battery system 54. The electrical components may include, but are not limited to, a bussed electrical center (BEC) 64, a battery electric control module (BECM) 66, an electrical distribution system (EDS) 68, which may include one or more wiring harnesses 70, a plurality of input/output (I/O) connectors 72, etc.

The cover 62 must be fixedly secured to the tray 60 in a manner that seals the enclosure assembly 58 and prevents moisture from entering into the interior of the battery pack 24 at a location between the cover 62 and the tray 60. To achieve these objectives, the battery pack 24 may include a urethane based adhesive 74 that is disposed between the tray 60 and the cover 62. Once cured, the urethane based adhesive 74 acts as both a fastener for securing the tray 60 and the cover 62 together and as a seal for blocking the ingress of moisture into the interior of the battery pack 24.

The urethane based adhesive 74 may be applied between a first peripheral flange 76 of the tray 60 and a second peripheral flange 78 of the cover 62. The first peripheral flange 76 and the second peripheral flange 78 establish sealing surfaces for sealing the gap between the tray 60 and the cover 62.

Fixation of the cover 62 to the tray 60 may be augmented by a plurality of fasteners 80 (see FIG. 2), such as screws, bolts, etc. The fasteners 80 may be inserted through the second peripheral flange 78 of the cover 62 and then into/through the first peripheral flange 76 of the tray 60 to aid fixation of the cover 62 to the tray 60. In an embodiment, the fasteners 80 are inserted through the first and second peripheral flanges 76, 78 at locations that are outboard of the urethane based adhesive 74. The fasteners 80 may provide increased fixation during the curing time of the urethane based adhesive 74. The fasteners 80 may also be employed for grounding the battery pack 24.

The urethane based adhesive 74 may include various chemical compositions. One suitable urethane based adhesive 74 is Betaseal™ 16605 urethane adhesive, manufactured by Dow Chemical Company. Other urethane based adhesives may also be suitable and may be selected based on various design criteria, including but not limited to, adherence characteristics of the tray 60/cover 62, temperature range of the battery pack 24, and cure time, viscosity, and strength of the adhesive.

Figure 5:
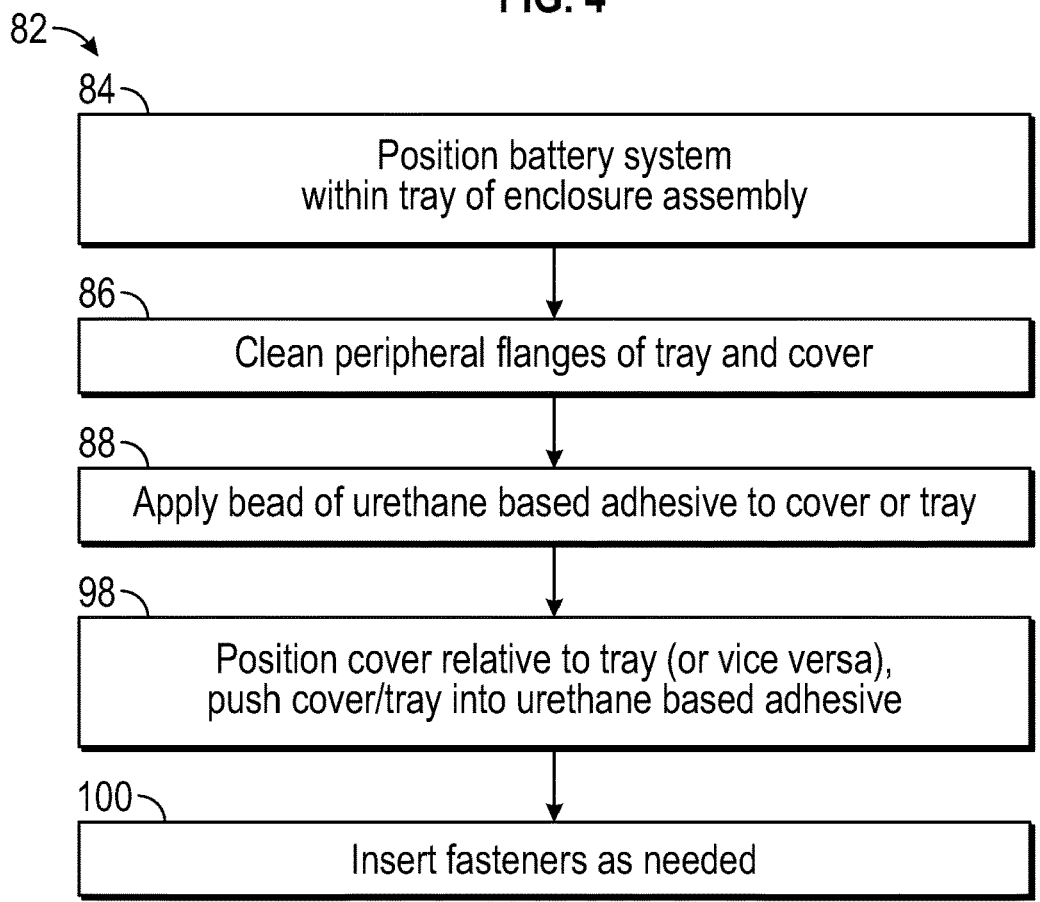
FIG. 5 schematically illustrates a method for assembling a battery pack.

FIG. 5, with continued reference to FIGS. 1-4, schematically illustrates, in sequential order, a method 82 for assembling the battery pack 24 discussed above. It should be understood that fewer or additional steps than are recited below could be performed and that the recited order of steps is not intended to limit this disclosure.

First, the battery system 54 may be positioned within the tray 60 of the enclosure assembly 58 (see block 84). Next, the first and second peripheral flanges 76, 78 of the tray 60 and cover 62 may be cleaned (see block 86) in order to remove any contaminants that could reduce the bonding effect of the urethane based adhesive 74. The first and second peripheral flanges 76, 78 may be cleaned with a high performance cloth or rag that is soaked with a suitable cleaning agent. In an embodiment, the cleaning agent is a non-aqueous, hydrocarbon-based solvent designed for cleaning and degreasing surfaces that are to be bonded with adhesives.

Figure 6:
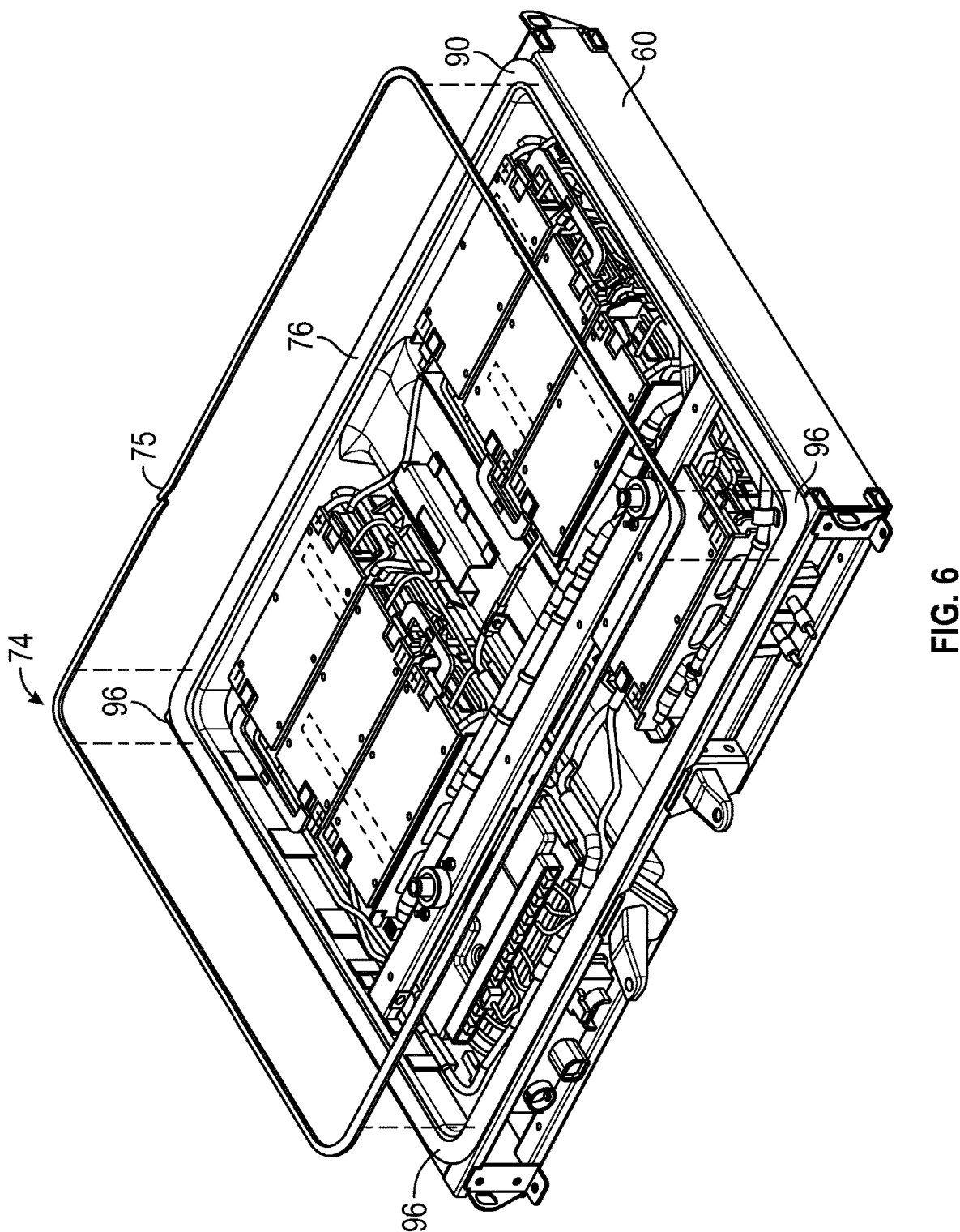
FIG. 6 illustrates applying a bead of a urethane based adhesive to a tray of an enclosure assembly during the method of FIG. 5.
Figure 7:
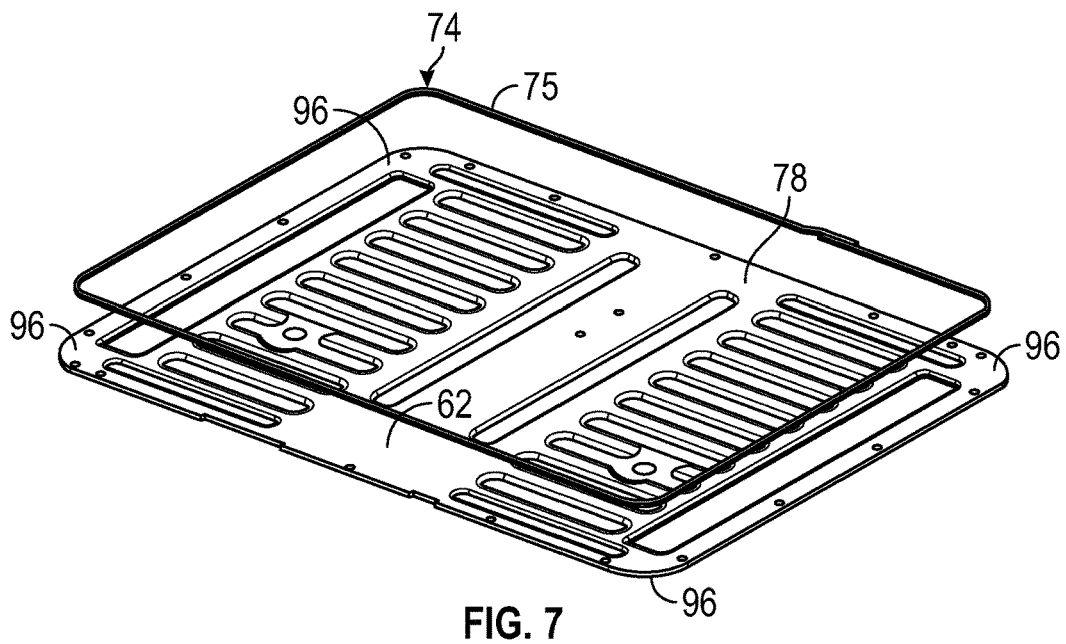
FIG. 7 illustrates applying a bead of a urethane based adhesive to a cover of an enclosure assembly during the method of FIG. 5.
Figure 8:
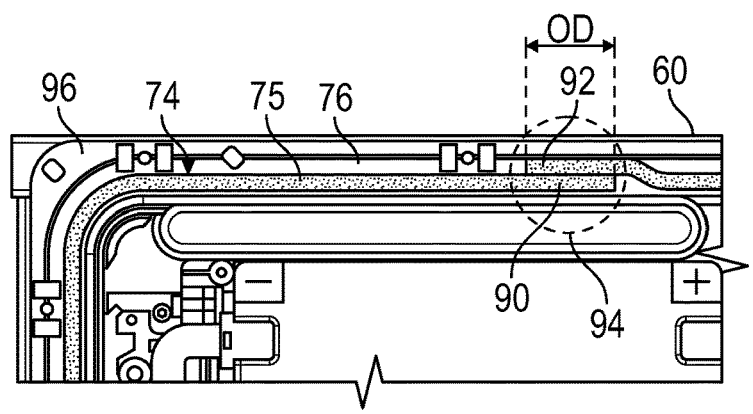
FIG. 8 illustrates a cross-over location of a urethane based adhesive applied during the method of FIG. 5.

Once the first and second peripheral flanges 76, 78 dry after the cleaning step of block 86, a bead 75 of the urethane based adhesive 74 may be applied to either the first peripheral flange 76 of the tray 60 (see FIG. 6) or the second peripheral flange 78 of the cover 62 (see FIG. 7) (see block 88). In either case, the bead 75 may be applied such that a second end portion 90 of the bead 75 overlaps a first end portion 92 of the bead 75 by an overlap distance OD at a cross-over location 94 of either the first peripheral flange 76 or the second peripheral flange 78 (see, e.g., FIG. 8). In an embodiment, the overlap distance OD is at least 80 mm (3.15 inches). The overlap distance OD helps ensure an adequate, gap-free seal once the bead 75 of the urethane based adhesive 74 cures.

In another embodiment, the cross-over location 94 is a location that is displaced from any corner 96 of either the tray 60 or the cover 62. The cross-over location 94 may therefore occur along any side portion of the tray 60 or cover 62 that spans between the corners 96.

Figure 9:
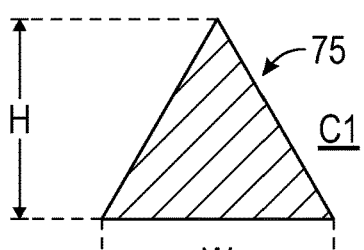
FIG. 9 illustrates a first configuration of a urethane based adhesive.

The bead 75 of the urethane based adhesive 74 may be applied in a first configuration C1 (see FIG. 9) to either the first peripheral flange 76 of the tray 60 or the second peripheral flange 78 of the cover 62. In an embodiment, the first configuration C1 is a pre-compressed configuration in which the bead 75 is substantially triangular shaped.

The cover 62 may subsequently be moved into position relative to the tray 60 (or the tray 60 may be moved into position relative to the cover 62) and then pushed into contact with the bead 75 of the urethane based adhesive 74 (see block 98) to secure the cover 62 to the tray 60. The urethane based adhesive 74 acts as both a fastener and a seal once it cures.

Figure 10:
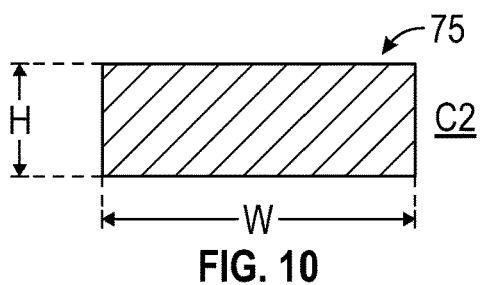
FIG. 10 illustrates a second configuration of a urethane based adhesive.

The bead 75 of the urethane based adhesive 74 may assume a second configuration C2 (see FIG. 10) after positioning the cover 62 into the tray 60 (or vice versa). In an embodiment, the second configuration C2 is a compressed configuration in which the bead 75 is substantially rectangular shaped. In an embodiment, a height H of the bead 75 when in the second configuration C2 is 20-30% of the height H of the bead 75 when in the first configuration C1, and a width W of the bead 75 when in the second configuration C2 is 50-75% larger than the width W of the bead 75 when in the first configuration C1.

Finally, a plurality of the fasteners 80 may be inserted through the cover 62 and into the tray 60 in order to augment fixation (see block 100). The total number of fasteners 80 required to achieve adequate fixation is reduced compared to known battery pack designs by using the urethane based adhesive 74.

Figure 11:
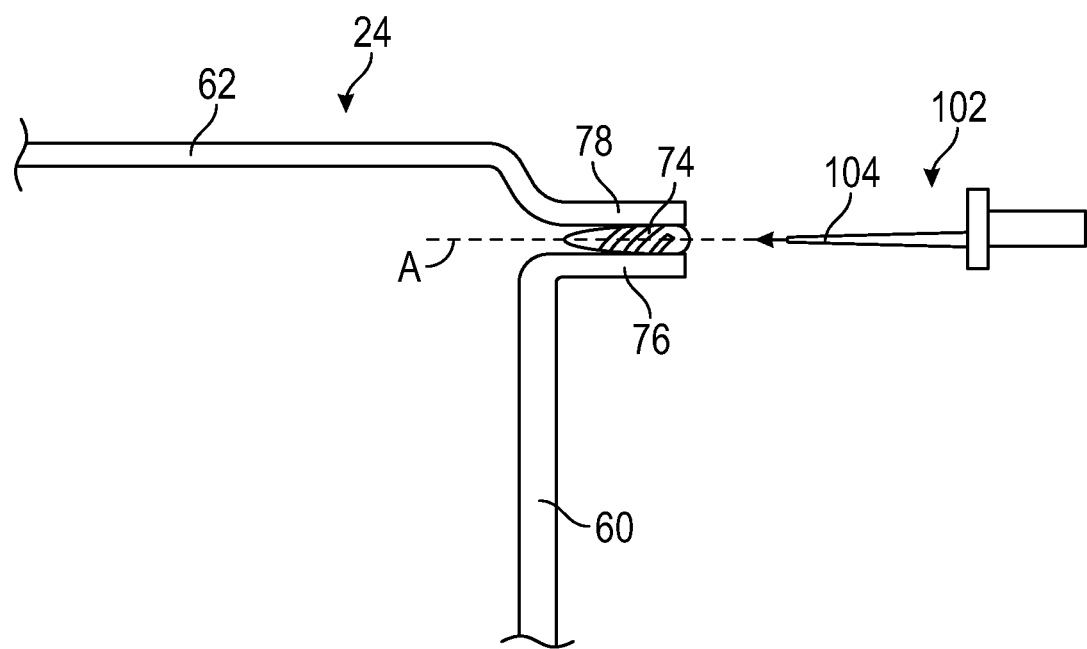
FIG. 11 schematically illustrates a battery pack servicing event.

FIG. 11 illustrates an exemplary servicing event for servicing the battery pack 24. For example, the urethane based adhesive 74 may need to be removed to gain access to the battery arrays 25 and other electronic components housed inside the enclosure assembly 58 of the battery pack 24 in order to service these components. As illustrated, a cutting tool 102 having a blade 104 may be inserted between the cover 62 and the tray 60 (e.g., along an axis A) to cut the urethane based adhesive 74 and allow the cover 62 to be separated from the tray 60.

The exemplary battery packs of this disclosure employ urethane based adhesives that function as both a fastener for securing the battery enclosure assembly components together and as a seal for blocking the ingress of moisture into the interior of the battery pack. Among other benefits, the urethane based adhesives contemplated herein reduce the number of required fasteners within the battery pack, eliminate the need for expensive gasket-type seals, and provide for the improved ability to seal between contour variations that can exist between abutting sealing surfaces of the battery pack.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of assembling a battery pack, comprising:
applying a bead of a urethane based adhesive to a component of an enclosure assembly of the battery pack, wherein, upon applying the bead, a first free end portion of the urethane based adhesive overlaps a second free end portion of the urethane based adhesive at a crossover location of the component,
wherein the bead is a single bead of the urethane based adhesive, and the first and second free end portions are first and second free end portions of the single bead.

2. The method as recited in claim 1, wherein the component is a tray of the enclosure assembly.

3. The method as recited in claim 1, wherein the component is a cover of the enclosure assembly.

4. The method as recited in claim 1, comprising:
prior to applying the bead, cleaning a sealing surface of the component.

5. The method as recited in claim 4, wherein the sealing surface is established by a peripheral flange of the component.

6. The method as recited in claim 4, comprising:
prior to cleaning the sealing surface, positioning a battery system within the component.

7. The method as recited in claim 1, comprising:
moving a second component of the enclosure assembly into the bead, thereby compressing the bead.

8. The method as recited in claim 7, comprising:
securing the component and the second component together with a fastener.

9. The method as recited in claim 1, wherein the first free end portion overlaps the second free end portion by at least 80 mm at the crossover location.

10. A method of assembling a battery pack, comprising:
applying a bead of a urethane based adhesive to a first component of an enclosure assembly of the battery pack,
wherein the bead is applied in a first configuration; and
moving a second component of the enclosure assembly into the bead, thereby compressing the bead into a second configuration.

11. The method as recited in claim 10, wherein the first configuration is a non-compressed configuration and the second configuration is a compressed configuration.

12. The method as recited in claim 10, wherein the bead includes a triangular shape in the first configuration and a rectangular shape in the second configuration.

13. The method as recited in claim 10, wherein applying the bead includes overlapping a second end portion of the bead with a first end portion of the bead by an overlap distance.

14. The method as recited in claim 13, wherein the overlap distance is at least 80 mm.

15. The method as recited in claim 10, comprising:
prior to applying the bead, cleaning a sealing surface of the first component.

16. The method as recited in claim 15, wherein the sealing surface is established by a peripheral flange of the first component.

17. The method as recited in claim 10, wherein the first component is a tray and the second component is a cover.

18. The method as recited in claim 10, wherein the first component is a cover and the second component is a tray.

19. The method as recited in claim 10, comprising:
holding the first and second components together with a fastener.

* * * * *